(12) United States Patent
Diamand (10) Patent No.: US 9,269,184 B2
(45) Date of Patent: Feb. 23, 2016

(54) METHOD AND APPARATUS FOR RENDERING IMAGE BASED PROJECTED SHADOWS WITH MULTIPLE DEPTH AWARE BLURS

(75) Inventor: Ben Diamand, Sherman Oaks, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1256 days.

(21) Appl. No.: 12/718,866

(22) Filed: Mar. 5, 2010

(65) Prior Publication Data

US 2010/0295853 A1  Nov. 25, 2010

Related U.S. Application Data

(60) Provisional application No. 61/180,389, filed on May 21, 2009.

(51) Int. Cl.
  *G06T 15/60* (2006.01)
  *G06T 15/40* (2011.01)

(52) U.S. Cl.
  CPC .............. *G06T 15/60* (2013.01); *G06T 15/405* (2013.01); *G06T 2215/12* (2013.01)

(58) Field of Classification Search
  CPC ..... G06T 11/001; G06T 11/40; G06T 15/503; G06T 15/005; G06T 2207/10028; G06T 5/20; G06T 5/2011; H04N 19/00769; H04N 19/00436
  USPC ......................................................... 345/522
  See application file for complete search history.

(56) References Cited

U.S. PATENT DOCUMENTS

| 5,347,374 | A | 9/1994 | Fuss et al. | |
| 6,480,192 | B1 * | 11/2002 | Sakamoto et al. | 345/419 |
| 6,903,741 | B2 | 6/2005 | Corbetta | |
| 7,006,684 | B2 | 2/2006 | Thornber et al. | |
| 7,142,709 | B2 | 11/2006 | Girard | |
| 7,307,631 | B2 * | 12/2007 | Robart | 345/426 |
| 8,081,181 | B2 * | 12/2011 | Peeper | 345/421 |
| 8,139,060 | B2 | 3/2012 | Brown et al. | |

(Continued)

OTHER PUBLICATIONS

"Image-Based Proxy Accumulation for Real-Time Soft Global Illumination" published on Proceedings of the 15th Pacific Conference on Computer Graphic and application (date: Oct. 29, 2007) by Sloan et al.*

(Continued)

*Primary Examiner* — Xiao Wu
*Assistant Examiner* — Kwang Lee
(74) *Attorney, Agent, or Firm* — Fitch, Even, Tabin & Flannery, LLP (57) ABSTRACT

A computer readable storage medium stores one or more computer programs adapted to cause a processor based system to execute steps including: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; and upsampling the small white buffer into a full sized white buffer, wherein the upsampling comprises using depth information as a metric. A method includes similar steps, and an apparatus includes a processor based system that is configured to execute similar steps.

34 Claims, 6 Drawing Sheets

(56) References Cited

U.S. PATENT DOCUMENTS

| | | | |
|---|---|---|---|
| 8,306,342 B2* | 11/2012 | Kim et al. | 382/236 |
| 8,325,186 B2 | 12/2012 | Diamand | |
| 2003/0179197 A1 | 9/2003 | Sloan et al. | |
| 2004/0032409 A1 | 2/2004 | Girard | |
| 2006/0221250 A1* | 10/2006 | Rossbach et al. | 348/630 |
| 2007/0002047 A1 | 1/2007 | Desgranges et al. | |
| 2009/0034868 A1* | 2/2009 | Rempel | G09G 3/3426 382/264 |
| 2009/0167763 A1 | 7/2009 | Waechter et al. | |
| 2010/0295851 A1 | 11/2010 | Diamand | |
| 2012/0269458 A1* | 10/2012 | Graziosi et al. | 382/299 |

OTHER PUBLICATIONS

USPTO, Office Action issued in U.S. Appl. No. 12/784,435 mailed Feb. 15, 2012, 6 pages.

Sloan, Peter-Pike et al.; "Image-Based Proxy Accumulation for Real-Time Soft Global Illumination"; Pacific Graphics 2007; Oct. 2007; pp. 1-9.

U.S. Appl. No. 61/312,656; filed Mar. 10, 2010; Inventor Ben Diamand; entitled "Method and Apparatus for Rendering Shadows"; all pages.

U.S. Appl. No. 61/180,389; filed May 21, 2009; Inventor Ben Diamand; entitled "Method and Apparatus for Rendering Image Based Projected Shadows With Multiple Depth Aware Blurs"; all pages.

Patent Cooperation Treaty; "Notification of Transmittal of the International Preliminary Report on Patentability" issued in corresponding PCT/US10/35676; mailed Sep. 27, 2011; 12 pages.

Patent Cooperation Treaty; "Notification of Transmittal of the International Search Report and the Written Opinion of the International Searching Authority or the Declaration" issued in corresponding PCT/US10/35676; mailed Sep. 23, 2010; 2 pages.

Patent Cooperation Treaty; "International Search Report" issued in corresponding PCT/US10/35676; mailed Sep. 23, 2010; 4 pages.

Patent Cooperation Treaty; "Written Opinion of the International Searching Authority" issued in corresponding PCT/US10/35676; mailed Sep. 23, 2010; 11 pages.

Boulanger, Real-Time Realistic Rendering of Nature Scenes with Dynamic Lighting, M.S. Inria, University of Rennes I, France, 2005. [Retrieved on Sep. 15, 2010]. Retrieved from the Internet: <URL:http://www.kevinboulanger.net/publications/thesisKevinBoulanger.pdf> pp. i-xx and 1-171.

USPTO; Notice of Allowance package issued in U.S. Appl. No. 12/784,435 mailed Jul. 25, 2012, 12 pages.

* cited by examiner

METHOD AND APPARATUS FOR RENDERING IMAGE BASED PROJECTED SHADOWS WITH MULTIPLE DEPTH AWARE BLURS

CROSS-REFERENCE TO RELATED APPLICATIONS

This application claims the benefit of U.S. Provisional Patent Application No. 61/180,389, filed May 21, 2009, entitled "METHOD AND APPARATUS FOR RENDERING IMAGE BASED PROJECTED SHADOWS WITH MULTIPLE DEPTH AWARE BLURS," the entire disclosure of which is hereby incorporated by reference herein in its entirety.

BACKGROUND OF THE INVENTION

1. Field of the Invention

The present invention relates generally to computer graphics, and more specifically to rendering shadows in computer graphics.

2. Discussion of the Related Art

Shadow mapping is a process by which shadows are added to three-dimensional (3D) computer graphics.

SUMMARY OF THE INVENTION

One embodiment provides a computer readable storage medium storing one or more computer programs adapted to cause a processor based system to execute steps comprising: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; and upsampling the small white buffer into a full sized white buffer, wherein the upsampling comprises using depth information as a metric.

Another embodiment provides a method, comprising: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; upsampling the small white buffer into a full sized white buffer, wherein the upsampling comprises using depth information as a metric and is performed by a processor-based apparatus.

Another embodiment provides an apparatus, comprising: a display; and a processor based system coupled to the display, wherein the processor based system is configured to execute steps comprising: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; and upsampling the small white buffer into a full sized white buffer, wherein the upsampling comprises using depth information as a metric.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

In three-dimensional (3D) computer graphics, z-buffering is the management of image depth values. Z-buffering is also known as depth buffering. When an object is rendered in 3D graphics, the depth of a generated pixel (z coordinate or z value) is stored in a buffer (the z-buffer or depth buffer).

As mentioned above, shadow mapping is a process by which shadows are added to 3D computer graphics. The process of creating shadows generally involves testing whether a pixel is visible from the light source. This test may be performed by comparing the pixel's depth in light space to a z-buffer or depth image of the light source's view.

Image-based modeling and rendering methods rely on a set of two-dimensional (2D) images of a scene to generate a 3D model and then render some novel views of this scene. Such methods eliminate the need to manually create a geometric model in 3D.

Aliasing refers to the distortion or artifacts that result when a signal reconstructed from samples is different than the original continuous signal. Anti-aliasing is the technique of minimizing such distortion artifacts when representing a high-resolution signal at a lower resolution. An anti-aliasing filter essentially blurs the image slightly in order to reduce resolution to below the limit of the digital sensor.

Some of the embodiments of the present invention provide one or more methods for rendering shadows in 3D computer graphics in a manner that reduces aliasing artifacts and that lends a soft appearance to the shadows. For example, in some embodiments the present invention provides a series of methods for rendering image based projected shadows with multiple depth aware blurs, a purpose of which includes reducing aliasing artifacts and lending a soft appearance to shadows rendered into a multisampled anti-aliased buffer.

Figure 1:
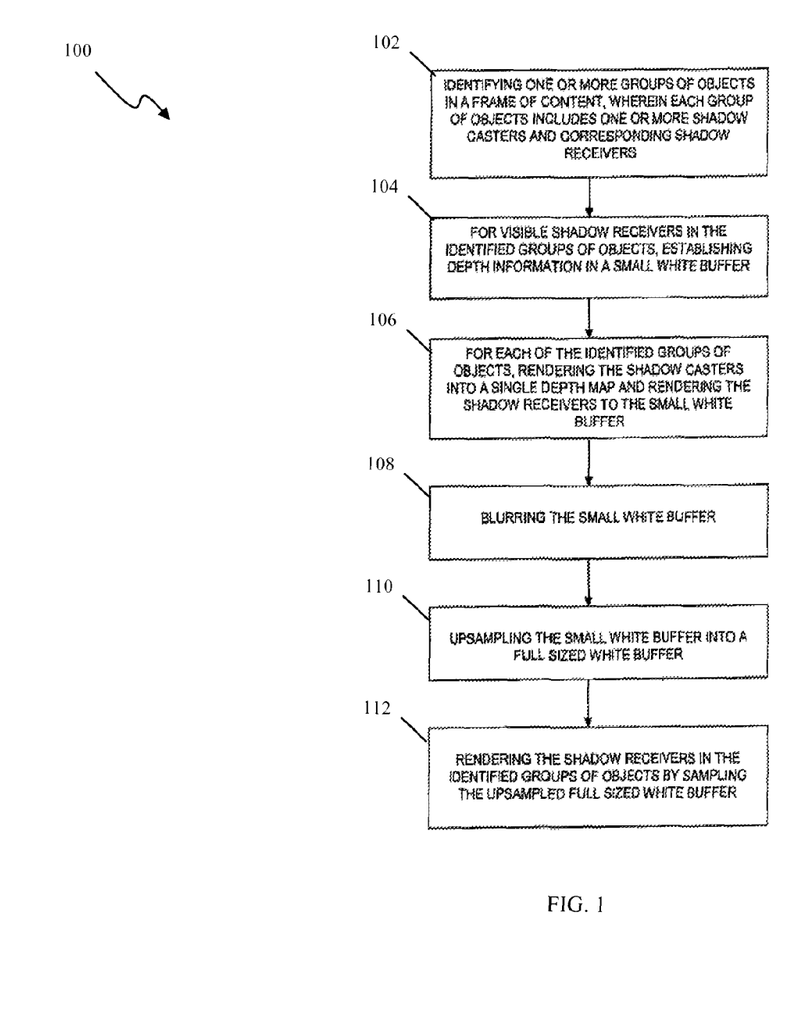
FIG. 1 is a flow diagram illustrating a method in accordance with an embodiment of the present invention.

Referring to FIG. 1, there is illustrated an example of a method 100 in accordance with an embodiment of the present invention. The method 100 may be used in 3D computer graphics for rendering image based projected shadows with multiple depth aware blurs. In some embodiments, the method 100 may be used for rendering such shadows in real time. The method 100 may be applied to any type of content, such as for example video games, both online and offline game types, simulations, other types of videos, etc.

The method 100 begins in step 102 where a frame of the content is analyzed. Specifically, one or more groups of objects in the frame are identified such that each group of objects includes one or more shadow casters and corresponding shadow receivers.

Figure 2:
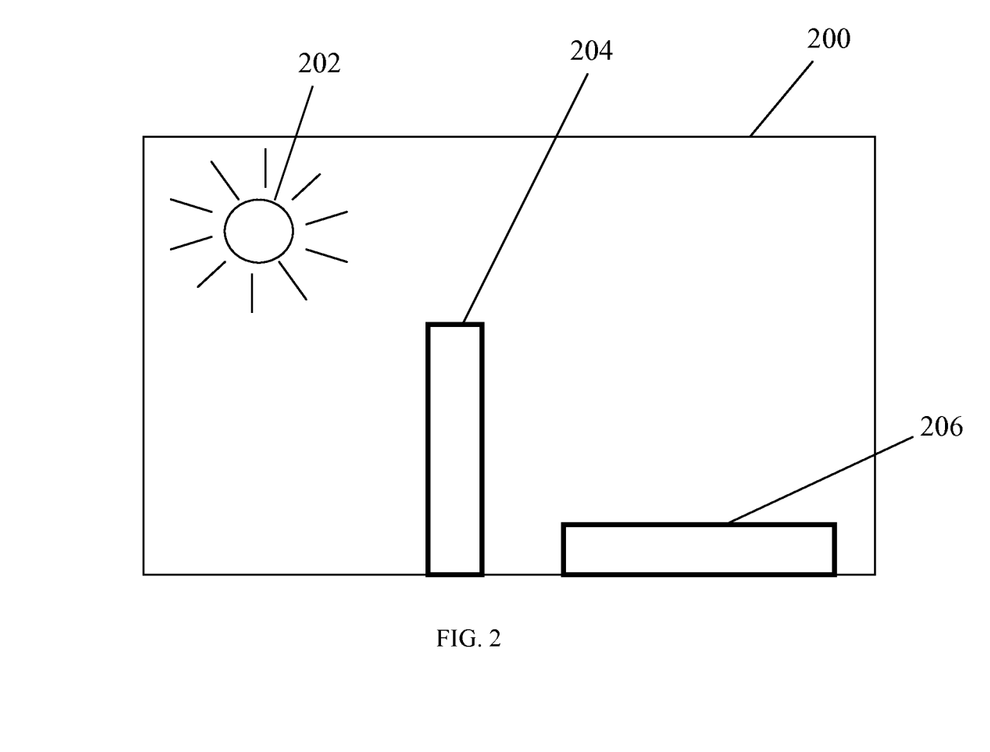
FIG. 2 is a screen shot illustrating a frame of content to illustrate techniques in accordance with an embodiment of the present invention.

FIG. 2 illustrates a frame 200 of content. The frame 200 includes a light source 202, a shadow caster 204, and a shadow receiver 206. A shadow caster is an object that casts shadows. A shadow receiver is an object that receives shadows, meaning that shadows can be cast onto it. The shadow caster 204 may be an object such as a wall or any other object, and the shadow receiver 206 may be an object such as piece of wood lying on the ground or any other object. The shadow caster 204 casts a shadow onto the shadow receiver 206. The shadow caster 204 and the shadow receiver 206 comprise a group of objects that includes one or more shadow casters and corresponding shadow receivers. Stated differently, the shadow caster 204 and the shadow receiver 206 comprise a casters/receivers pair.

In step 104 (FIG. 1), depth information for visible shadow receivers in the identified groups of objects is established in a small white buffer. In some embodiments, this buffer is actually composed of a depth buffer and a color buffer. The small white buffer may be referred to as a deferred buffer. In some embodiments, this step may be performed by rendering a depth prepass to the small white buffer. In some embodiments, however, it is not necessary to render receivers into the white buffer if a depth prepass has already been performed at the full resolution. In this case, the small white buffer's depth may be constructed by downsampling the larger depth buffer. Point sampling the large buffer is sufficient.

In step 106, for each of the identified groups of casters/receivers pairs, the shadow casters are rendered into a single depth map, and if necessary, the shadow receivers are rendered to the small white buffer.

In step 108, the small white buffer is blurred. In some embodiments a low resolution blur may be used.

In step 110, the small white buffer is upsampled into a full sized white buffer. That is, the small white buffer is made bigger. In some embodiments, the upsampling technique may use depth values or information as a metric. That is, in some embodiments the upsampling comprises using depth information as a metric. A technique for performing the upsampling that may be used in some embodiments will be described below. The upsampling technique described below upsamples the deferred buffer in a manner that is can preserve more detail than simply using a box filter. In some embodiments, the upsampling technique described below may comprise features of bilateral upsampling techniques.

In step 112, the shadow receivers in the identified groups of objects are rendered by sampling the upsampled full sized white buffer.

Figure 3A:
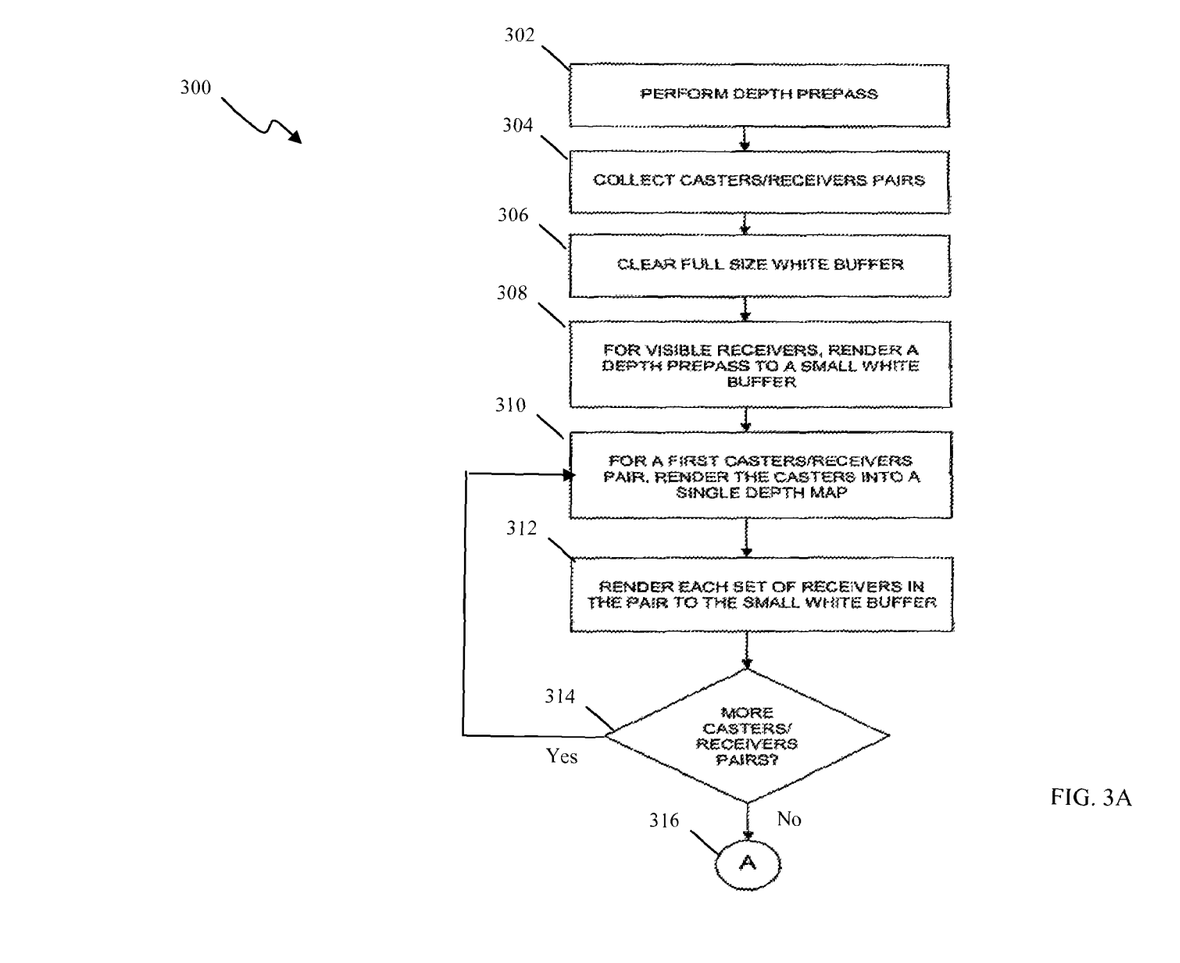
FIGS. 3A and 3B are flow diagrams illustrating a method in accordance with an embodiment of the present invention.
Figure 3B:
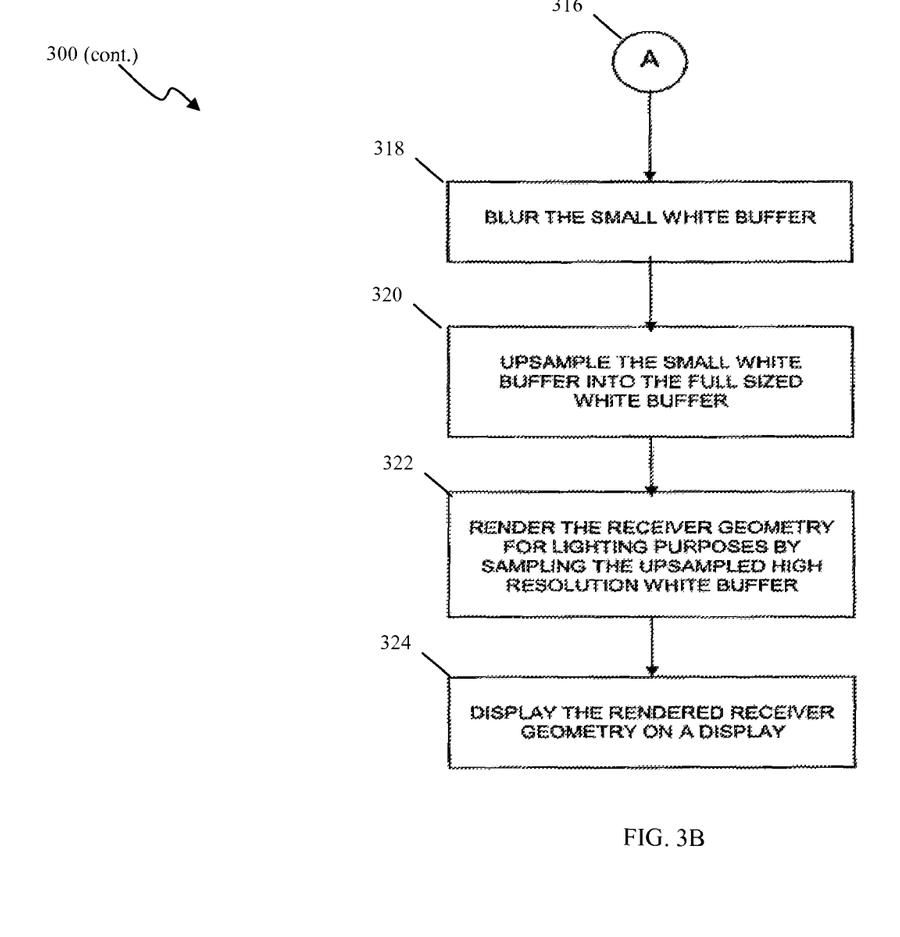

An embodiment will now be described in greater detail with reference to FIGS. 3A and 3B. Specifically, there is a method 300 in accordance with an embodiment of the present invention. The method 300 may be used in 3D computer graphics for rendering image based projected shadows with multiple depth aware blurs, which helps to reduce aliasing artifacts and lend a soft appearance to shadows rendered into a multisampled anti-aliased buffer. In some embodiments, the method 300 may be used for rendering such shadows in real time. The method 300 may be applied to any type of content, such as for example video games, both online and offline game types, simulations, other types of videos, etc.

In step 302, depth is cleared and a depth prepass is performed with all opaque and cutout geometry in the content.

In step 304, for every frame of the content, all objects or subsets of objects are gathered into collections of shadow casters/shadow receivers pairs for those active shadowing lights affecting visible receiver geometry. Thus, the shadow casters/receivers pairs of objects in the frame include one or more shadow casters and corresponding shadow receivers. In the discussion herein, the term "shadow casters" may be simplified to "casters", and the term "shadow receivers" may be simplified to "receivers".

In step 306, a "white buffer" is cleared and the depth is set to its default value, and the color is set to full intensity (white). This buffer is referred to herein as the full sized white buffer.

In step 308, only for all visible receivers selected previously, another depth prepass is rendered, but to a much smaller "white" buffer. This buffer is referred to herein as the small white buffer. Alternatively, it is also sufficient to downsample the depths from the full sized white buffer.

Next, for each casters/receivers pair, the casters for the pair are rendered into a single depth map. Then, each set of receivers in the pair are rendered to the small white buffer. Alternatively, downsampled depth values from the small buffer may be used. These steps are illustrated by steps 310, 312 and 314. Namely, in step 310 the casters in a first casters/receivers pair are rendered into a single depth map. Then in step 312, each set of receivers in the pair are rendered to the small white buffer.

In some embodiments, step 312 of rendering each set of receivers in the pair to the small white buffer may be performed using an appropriate amount of filtering samples. By way of example, in some embodiments Percentage Closer Filtering (PCF) may be used. The sample width may be adjusted based on the derivative of the depth as well as the derivatives of the shadow maps sampling texture coordinates. Optionally, in some embodiments, a Poisson sampling distribution may be used to mask high frequency "steps" resulting from undersampling the caster depth map. In some embodiments, the shadowed sample may be written into the small white buffer using a MIN blend mode.

In step 314, the system determines whether or not there are any more casters/receivers pairs. If so, steps 310 and 312 are repeated. Steps 310 and 312 are repeated for each casters/receivers pairs. Once step 314 determines that there are no more casters/receivers pairs, then the process flow proceeds through connector 316 and on to step 318 (FIG. 3B).

In step 318, the small white buffer is blurred. In some embodiments, the small white buffer may be blurred with a depth aware low pass filter. In some embodiments, for those samples that are too far in terms of depth distance from the sample point, their influence is not included in the blur. That is, in some embodiments, the blurring comprises not including an influence of samples having a depth that is beyond a certain distance from a sample point. In some embodiments, for those samples within an acceptable depth distance, they are weighted based on distance and include in the filter. That is, in some embodiments, the blurring comprises weighting based on distance each sample having a depth that is within a certain distance from a sample point. Again, the word "far" refers to depth distance.

Blurring the small white buffer is effectively performing a low resolution blur. The small white buffer is blurred with itself, and in some embodiments the blur is based on the relative depth values of the pixels. That is, the Z values (or depth values) are taken into account in performing the blur. In some embodiments, an in-place blur is performed by deciding which pixels to blur based on their relative depth values. Thus, depth information or values are used as a metric. In some embodiments, the blur performed on the small white buffer may be a bilateral blur.

Taking the Z value differences between the pixels in the small white buffer into account helps to preserve detail. This is because the Z value differences are used to determine how much influence a neighboring pixel will provide in the blur, that is how much of a neighboring pixel to add in. In some embodiments, if the Z values of neighboring pixels are similar (i.e. the Z value difference is small), then the neighboring pixels will be used to provide an influence in the blur. But if the Z values of neighboring pixels are very different (i.e. the Z value difference is large), then the influence of the neighboring pixel will not be used in the blur. The Z value difference may be large if, for example, a shadow boundary lies between the two pixels. In this case, not using the influence of the pixel in the blur helps to preserve detail because the shadow boundary will remain sharp and not be smudged by the blur. Performing an in-place blur on the small white buffer helps to get smooth changes in shadows. Thus, using depth information or values as a metric helps to determine how much influence neighboring pixels will have in the blur. In some embodiment, pixels are effectively thrown out that are too different in depth. This way, pixels are only smudged together when it makes sense to smudge them together. In some embodiments, the blur may be a bilateral blur.

In step 320, the small white buffer is upsampled into the full sized white buffer. In some embodiments, the small white buffer may be upsampled into the full sized white buffer using the high resolution depth information stored in the first depth prepass (e.g. step 302) to weight each of a number of "bilinear" low resolution samples. In some embodiments, the small white buffer may be upsampled into the full sized white buffer using the high resolution depth information stored in the first depth prepass (e.g. step 302) to weight each of, for example, four "bilinear" low resolution samples.

Similar to the previous blur in step 318, in some embodiments of step 320, the weights are set to zero for each sample whose depth is too far from the high resolution sample point's depth. That is, in some embodiments, the upsampling comprises setting weights to zero for each sample having a depth that is beyond a certain distance from a high resolution sample point's depth. In some embodiments, for those samples within an acceptable distance, they are weighted based on distance and included in the filter. That is, in some embodiments, the upsampling comprises weighting based on distance each sample having a depth that is within a certain distance from a high resolution sample point's depth. In some embodiments, if no samples are close enough, then only the bilinear weight is used. In some embodiments, this kind of filter may include techniques used in a bilateral filter. In some embodiments, the upsampling may comprise bilateral upsampling.

An example embodiment for step 320 of performing the upsampling will be further described below.

In step 322, the receiver geometry is rendered for lighting purposes. In some embodiments, the receiver geometry is rendered for lighting purposes by sampling the now upsampled high resolution white buffer. That is, in some embodiments, the shadow receivers are rendered by sampling the upsampled full sized white buffer.

In some embodiments, step 322 may be performed by using multisample anti-aliasing (MSAA). If using MSAA, fewer samples will run than exist in the high resolution white buffer. In this case, in some embodiments, the instant depth may be taken and compared to the depths contained in the high resolution white buffer. If all samples are roughly the same distance from the instant depth, then all high resolution white buffer samples may be evenly weighted and the aggregate shadow value used to attenuate (shadow) the contribution of any dynamic lights that are marked to gather shadows from the white buffer. In some embodiments, any samples whose depths are too far from the closest white buffer depth are discarded, and the remaining samples are used to form an aggregate shadow value for attenuation purposes.

In step 324, the rendered shadow receivers may be displayed on a display.

Figure 4:
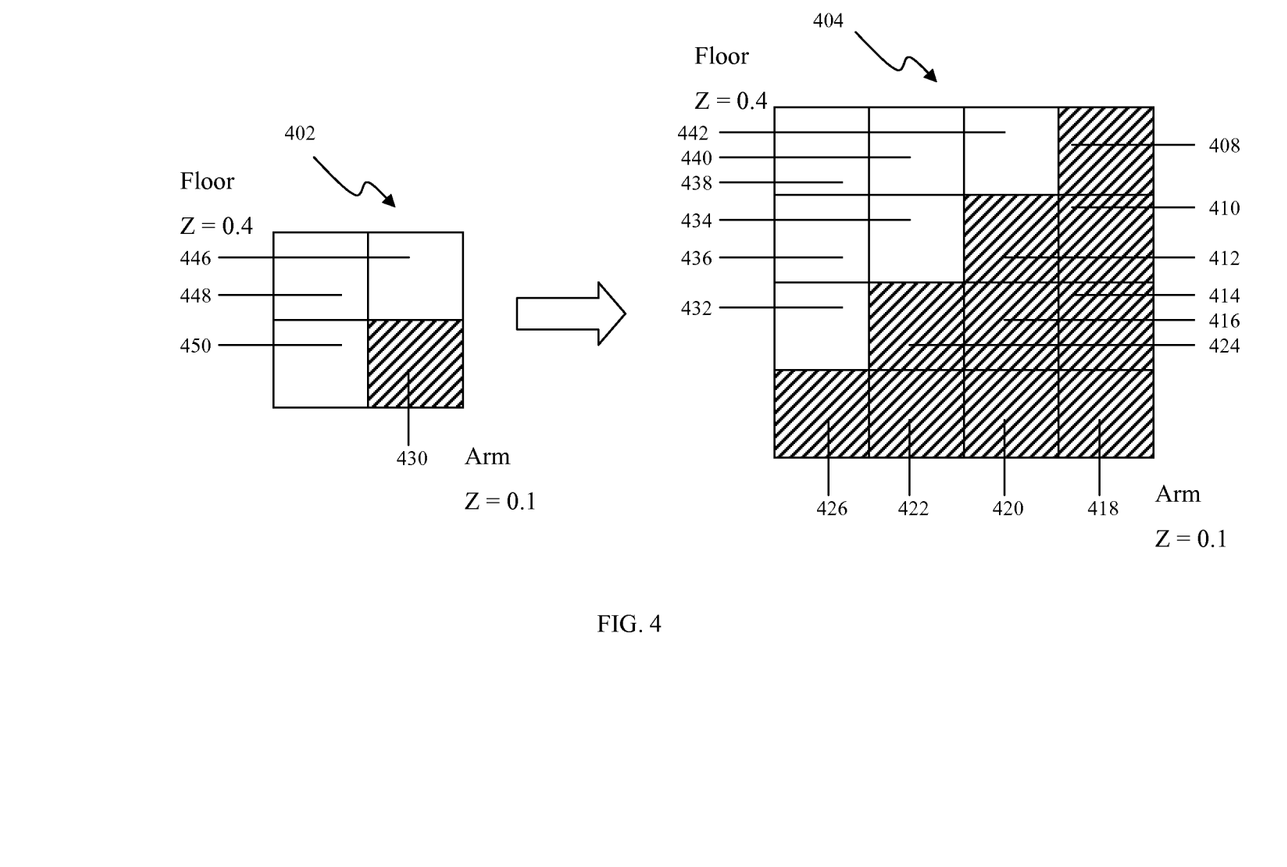
FIG. 4 is a schematic diagram illustrating a method in accordance with an embodiment of the present invention.

An example embodiment of step 320 in which the small white buffer is upsampled into the full sized white buffer will now be described. FIG. 4 illustrates a small white buffer 402 that is to be upsampled into a full sized white buffer 404. As mentioned above, the small white buffer 402 may be referred to as a deferred buffer. The process of upsampling is sometimes referred to as "zooming up" the small white buffer 402 to the full sized white buffer 404, or making the small buffer into a big buffer. Portion of pixels of small buffer map to pixels in big buffer. In this example, the upsampling is going from 2×2 (i.e. 4 pixels) to 4×4 (i.e. 16 pixels). It should be understood, however, that the methods and techniques described herein may be applied to upsample any size small buffer to any size full size buffer.

One way to perform upsampling is to use a box filter to zoom up the small white buffer 402. With this technique, for each pixel in the full sized white buffer 404, weights are assigned to the pixels in the small white buffer 402. The weights assigned to the pixels in the small white buffer 402 determine the amount of influence that the those pixels will have on the particular pixel in the full sized white buffer 404. The weights assigned to the pixels in the small white buffer 402 will typically sum up to one.

One problem with the box filter technique is that it deals only with the color of the pixels and does not take into account the depth values of the pixels. This can lead to the undesirable result of a pixel in the small white buffer 402 providing color influence when it really should not because it is at a much different depth than the pixel in the full sized white buffer 404 that it is influencing.

For example, the cross-hatched pixels 408, 410, 412, 414, 416, 418, 420, 422, 424, and 426 in the full sized white buffer 404 may represent a person's arm. Similarly, the cross-hatched pixel 430 in the small white buffer 402 represents the person's arm at a lower resolution. The person's arm may be close to the camera, and so the Z value (i.e. the depth) of those pixels may be approximately Z=0.1 (where the camera is Z=0.0). The remaining pixels 432, 434, 436, 438, 440, and 442 in the full sized white buffer 404, and the remaining pixels 446, 448 and 450 in the small white buffer 402, may represent the floor. The floor is farther away (more distant) from the camera, and so the Z value (i.e. the depth) of those pixels may be approximately Z=0.4.

The box filter technique would cause pixel 448 in the small white buffer 402 to influence the color of pixel 418 in the full sized white buffer 404. However, this is undesirable because pixel 448 is clearly the floor, and pixel 418 is clearly the person's arm. Similarly, the box filter technique would cause pixel 430 in the small white buffer 402 to influence the color of pixel 438 in the full sized white buffer 404. However, this is undesirable because pixel 430 is clearly the person's arm, and pixel 438 is clearly the floor.

In order to avoid these disadvantages, embodiments of the present invention use depth (i.e. Z values) as a metric in upsampling color information. That is, in some embodiments, the metric that is used is depth. For example, in some embodiments, pixels in the small white buffer 402 are not used to influence pixels in the full sized white buffer 404 that have a much different Z value. Namely, depth information is used to throw out certain pixel weights because they have bad information. The pixel weights to throw out are identified based on depth information (i.e. Z values). In some embodiments, the depth values of the pixels in the full sized white buffer 404 may be determined by taking the proportionate depth amount of the pixels in the small white buffer 402. That is, for each of the sixteen pixels in the full sized white buffer 404, take the proportionate depth amount of the four pixels in the small white buffer 402.

In some embodiments of the present invention, the step of upsampling generally involves looking at the depth value, constructing what the weights would be, and then throwing out values or re-weighting values based on differences in depth. Thus, this is a conditional process because it throws out some values. A determination is made for each pixel as to whether the high resolution depth matches the low resolution depth. If not, the influence of the pixel is thrown out or reweighted.

For example, in some embodiments, the step of upsampling may involve constructing what the pixel weights for the pixels in the small white buffer 402 would be for a particular pixel in the full sized white buffer 404. Then, the depth values (i.e. Z values) for the pixels in the small white buffer 402 are compared to the depth value of the particular pixel in the full sized white buffer 404. This essentially determines whether the high resolution depth matches the low resolution depth. For pixels in the small white buffer 402 where the difference in the depth value is large, the influence of those pixels is either thrown out or re-weighted. This is because those pixels would contribute bad shadow information. Not using the influence of those pixels helps keep the shadow edge straight. Namely, this preserves sharp edges by systematically excluding pixels across the discontinuity from consideration.

Thus, in some embodiments, the pixel weight information is used in the upsampling, unless it is found that the depths vary by more than a certain amount. For pixels where the depths vary by more than a certain amount, the weight information for those pixels is either thrown out, or they are reweighted. Thus, in some embodiments, pixels are thrown out having depths that do not match. That is, they are thrown out based on their Z value. Not using the influence of such pixels, or throwing them out, helps to preserve detail. Detail is preserved because the color of a pixel in the small white buffer 402 is not used to influence the color of a pixel in the full sized white buffer 404 having a much different depth. In this way, depth information or values (i.e. Z values) are used as a metric. It is noted that the blurring step described above is similar in that depth is also used as a metric.

In some embodiments, the weight of the low resolution samples may be determined as follows. Specifically, a range of Z values may be chosen. That is, a delta Z between the small and large buffer may be chosen to define a tolerance. Pixels that are within the tolerance of Z values may be treated as the same. That is, even if they do not match, they are treated as the same if they are close. A small tolerance may give more detail. A small tolerance may avoid it leaking to something else. In some embodiments, the artist may have control over the tolerance. That is, the artist can change/modify the tolerance. Thus, the tolerance may be used to identify sameness. For pixels in the tolerance, they may be treated the same. In some embodiments, edge pixels may be faded off slowly.

Thus, the upsampling process involves zooming up a small buffer to a big buffer. In some embodiments, the metric of correction is depth. Namely, if pixels are close in depth, then their influence is used in the upsampling. If pixels are not close in depth, then their influence may not be used in the upsampling. As mentioned above, in the illustrated example, the upsampling is going from 2×2 (i.e. 4 pixels) to 4×4 (i.e. 16 pixels). It should be understood, however, that the methods and techniques described herein may be applied to upsample any size small buffer to any size full size buffer. That is, the upsample ratio may vary. In some embodiments, the small white buffer may be chosen to have an aspect ratio similar to the full size white buffer. In general, the larger the small white buffer, the more detail that can be obtained. However, increasing the size of the small white buffer generally increases costs.

In some embodiments, the upsampling (step 320) may comprise bilateral upsampling, or a bilateral upsample process. For example, in some embodiments, the process of zooming up the deferred buffer may involve bilateral upsampling techniques. In some embodiments, some of the above-described techniques for upsampling may be referred to as a bilateral upsample process. In some embodiments, the techniques may include techniques used in bilateral filtering techniques. A bilateral filtering technique is discussed in the paper entitled "Image-Based Proxy Accumulation for Real-Time Soft Global Illumination", by Peter-Pike Sloan, Naga K. Govindaraju, Derek Nowrouzezahrai, John Snyder, Pacific Graphics 2007, October 2007, the entire contents and disclosure of which is hereby incorporated by reference herein in its entirety.

As has been described, in some embodiments of the present invention there is provided a series of methods for rendering image based projected shadows with multiple depth aware blurs, a purpose of which is to reduce aliasing artifacts and lend a soft appearance to shadows rendered into a multi-sampled anti-aliased buffer. In some embodiments, the methods and techniques may be used for rendering such shadows in real time. In some embodiments, aspects involve the use of a small white buffer or a deferred buffer, a blurring technique that uses depth as a metric, and an upsample technique that takes the deferred buffer and zooms it up to a large buffer using depth as a metric. In some embodiments, the blurring comprises using depth values to determine whether or not a sample should be used in the blurring. In some embodiments, the upsampling comprises using depth values to determine whether or not a sample should be used in the upsampling.

In some embodiments, the above-described methods and techniques may utilize or be combined with various shadow mapping and image based blurring algorithms. For example, in some embodiments, the above-described methods and techniques may include, or be combined with, or involve a synthesis of particular sequences and applications of shadow mapping and image based depth-aware blurring algorithms.

Figure 5:
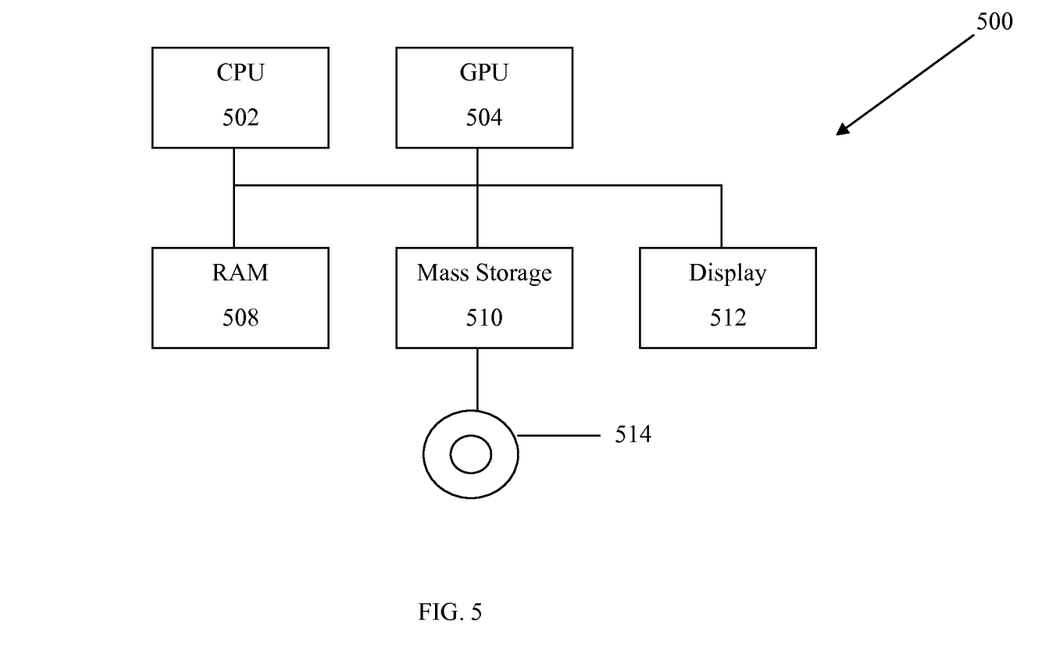
FIG. 5 is a block diagram illustrating a computer or other processor based system that may be used to run, implement and/or execute the methods and techniques shown and described herein in accordance with the embodiments of the present invention.

The methods and techniques described herein may be utilized, implemented and/or run on many different types of systems, including for example computers, game consoles, entertainment systems, etc. Referring to FIG. 5, there is illustrated an apparatus or system 500 that may be used for any such implementations. One or more components of the apparatus or system 500 may be used for implementing any system or device mentioned above, such as for example any of the above-mentioned computers, game consoles, entertainment systems, etc. However, the use of the apparatus or system 500 or any portion thereof is certainly not required.

By way of example, the apparatus or system 500 may include, but is not required to include, a central processing unit (CPU) 502, a graphics processing unit (GPU) 504, a random access memory (RAM) 508, and a mass storage unit 510, such as a disk drive or other type of memory. The apparatus or system 500 may be coupled to, or integrated with, any of the other components described herein, such as a display 512. The apparatus or system 500 comprises an example of a processor based apparatus or system. The CPU 502 and/or GPU 504 may be used to execute or assist in executing the steps of the methods and techniques described herein, and various program content, images, shadows, lighting, etc. may be rendered on the display 512.

The mass storage unit 510 may include or comprise any type of computer readable storage or recording medium or media. The computer readable storage or recording medium or media may be fixed in the mass storage unit 510, or the mass storage unit 510 may optionally include removable storage media 514, such as a digital video disk (DVD), Blu-ray disc, compact disk (CD), USB storage device, floppy disk, or other media. By way of example, the mass storage unit 510 may comprise a disk drive, a hard disk drive, flash memory device, USB storage device, Blu-ray disc drive, DVD drive, CD drive, floppy disk drive, etc. The mass storage unit 510 or removable storage media 514 may be used for storing program code or macros that implement the methods and techniques described herein.

Thus, removable storage media 514 may optionally be used with the mass storage unit 510, which may be used for storing program code that implements the methods and techniques described herein. However, any of the storage devices, such as the RAM 508 or mass storage unit 510, may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 508 or mass storage unit 510, may be used for storing any needed database(s).

In some embodiments, one or more of the embodiments, methods, approaches, and/or techniques described above may be implemented in a computer program executable by a processor based system. By way of example, such processor based system may comprise the processor based system 500, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for rendering image based projected shadows with multiple depth aware blurs. As another example, such computer program may be used for implementing any type of tool or similar utility that uses any one or more of the above described embodiments, methods, approaches, and/or techniques. In some embodiments, the computer program may comprise a video game, role-playing game (RPG), other computer simulation, or system software such as an operating system, BIOS, macro, or other utility. In some embodiments, program code macros, modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer readable storage medium storing one or more computer programs adapted to cause a processor based system to execute steps comprising: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; and upsampling the small white buffer into a full sized white buffer, wherein the upsampling comprises using depth information as a metric.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory computer readable storage medium storing one or more computer programs adapted to cause a processor based system to execute steps comprising:
   identifying one or more groups of objects in a frame of content, wherein each group of objects includes one or more shadow casters and corresponding shadow receivers;
   for visible shadow receivers in the identified groups of objects, establishing depth information in a small buffer;
   for each of the identified groups of objects, rendering the shadow casters into a single depth map;
   blurring the small buffer;
   after the blurring the small buffer, upsampling the blurred small buffer into a full sized buffer, wherein the upsampling comprises using depth information as a metric in upsampling color information; and
   rendering the shadow receivers in the identified groups of objects by sampling the upsampled full sized buffer.

2. The computer readable storage medium of claim 1, wherein the sampling the upsampled full sized buffer comprises discarding samples having a depth that is beyond a certain distance from a sample point.

3. The computer readable storage medium of claim 1, wherein the one or more computer programs are further adapted to cause the processor based system to execute steps comprising:
   performing a first depth prepass with all opaque and cutout geometry in the content;
   wherein the upsampling is performed using high resolution depth information stored in the first depth prepass to weight each of a number of bilinear low resolution samples.

4. The computer readable storage medium of claim 1, wherein the upsampling comprises setting weights to zero for each sample having a depth that is beyond a certain distance from a high resolution sample point's depth.

5. The computer readable storage medium of claim 1, wherein the upsampling comprises weighting based on distance each sample having a depth that is within a certain distance from a high resolution sample point's depth.

6. The computer readable storage medium of claim 1, wherein the blurring comprises performing blurring with a depth aware low pass filter.

7. The computer readable storage medium of claim 1, wherein the blurring comprises not including an influence of samples having a depth that is beyond a certain distance from a sample point.

8. The computer readable storage medium of claim 1, wherein the blurring comprises weighting based on distance each sample having a depth that is within a certain distance from a sample point.

9. The computer readable storage medium of claim 1, wherein the establishing depth information in a small buffer comprises rendering a depth prepass to the small buffer for visible shadow receivers in the identified groups of objects.

10. The computer readable storage medium of claim 1, wherein the one or more computer programs are further adapted to cause the processor based system to execute steps comprising:
for each of the identified groups of objects, rendering the shadow receivers to the small buffer;
wherein the rendering the shadow receivers to the small buffer comprises using a certain amount of filtering samples.

11. The computer readable storage medium of claim 1, wherein the upsampling comprises using depth values to determine whether or not a sample should be used in the upsampling.

12. The computer readable storage medium of claim 1, wherein the blurring comprises using depth values to determine whether or not a sample should be used in the blurring.

13. A method, comprising:
identifying one or more groups of objects in a frame of content, wherein each group of objects includes one or more shadow casters and corresponding shadow receivers;
for visible shadow receivers in the identified groups of objects, establishing depth information in a small buffer;
for each of the identified groups of objects, rendering the shadow casters into a single depth map;
blurring the small buffer;
after the blurring the small buffer, upsampling the blurred small buffer into a full sized buffer, wherein the upsampling comprises using depth information as a metric in upsampling color information and is performed by a processor-based apparatus; and
rendering the shadow receivers in the identified groups of objects by sampling the upsampled full sized buffer.

14. The method of claim 13,
wherein the sampling the upsampled full sized buffer comprises discarding samples having a depth that is beyond a certain distance from a sample point; and
wherein the method further comprises displaying the rendered shadow receivers on a display.

15. The method of claim 13, further comprising:
performing a first depth prepass with all opaque and cutout geometry in the content;
wherein the upsampling is performed using high resolution depth information stored in the first depth prepass to weight each of a number of bilinear low resolution samples.

16. The method of claim 13, wherein the upsampling comprises setting weights to zero for each sample having a depth that is beyond a certain distance from a high resolution sample point's depth.

17. The method of claim 13, wherein the upsampling comprises weighting based on distance each sample having a depth that is within a certain distance from a high resolution sample point's depth.

18. The method of claim 13, wherein the blurring comprises performing blurring with a depth aware low pass filter.

19. The method of claim 13, wherein the blurring comprises not including an influence of samples having a depth that is beyond a certain distance from a sample point.

20. The method of claim 13, wherein the blurring comprises weighting based on distance each sample having a depth that is within a certain distance from a sample point.

21. The method of claim 13, wherein the establishing depth information in a small buffer comprises rendering a depth prepass to the small buffer for visible shadow receivers in the identified groups of objects.

22. The method of claim 13, further comprising:
for each of the identified groups of objects, rendering the shadow receivers to the small buffer;
wherein the rendering the shadow receivers to the small buffer comprises using a certain amount of filtering samples.

23. The method of claim 13, wherein the upsampling comprises using depth values to determine whether or not a sample should be used in the upsampling.

24. The method of claim 13, wherein the blurring comprises using depth values to determine whether or not a sample should be used in the blurring.

25. An apparatus, comprising:
a display; and
a processor based system coupled to the display, wherein the processor based system is configured to execute steps comprising:
identifying one or more groups of objects in a frame of content, wherein each group of objects includes one or more shadow casters and corresponding shadow receivers;
for visible shadow receivers in the identified groups of objects, establishing depth information in a small buffer;
for each of the identified groups of objects, rendering the shadow casters into a single depth map;
blurring the small buffer;
after the blurring the small buffer, upsampling the blurred small buffer into a full sized buffer, wherein the upsampling comprises using depth information as a metric in upsampling color information; and
rendering the shadow receivers in the identified groups of objects by sampling the upsampled full sized buffer.

26. The apparatus of claim 25, wherein
the sampling the upsampled full sized buffer comprises discarding samples having a depth that is beyond a certain distance from a sample point; and
wherein the processor based system is further configured to execute a step comprising displaying the rendered shadow receivers on the display.

27. The apparatus of claim 25, wherein the upsampling comprises setting weights to zero for each sample having a depth that is beyond a certain distance from a high resolution sample point's depth.

28. The apparatus of claim 25, wherein the upsampling comprises weighting based on distance each sample having a depth that is within a certain distance from a high resolution sample point's depth.

29. The apparatus of claim 25, wherein the blurring comprises performing blurring with a depth aware low pass filter.

30. The apparatus of claim 25, wherein the blurring comprises not including an influence of samples having a depth that is beyond a certain distance from a sample point.

31. The apparatus of claim 25, wherein the blurring comprises weighting based on distance each sample having a depth that is within a certain distance from a sample point.

32. The apparatus of claim 25, wherein the establishing depth information in a small buffer comprises rendering a depth prepass to the small buffer for visible shadow receivers in the identified groups of objects.

33. The apparatus of claim 25, wherein the upsampling comprises using depth values to determine whether or not a sample should be used in the upsampling.

34. The apparatus of claim 25, wherein the blurring comprises using depth values to determine whether or not a sample should be used in the blurring.

* * * * *